United States Patent
Mikami et al.

(12) 
(10) Patent No.: US 7,718,728 B2
(45) Date of Patent: May 18, 2010

(54) RUBBER COMPOSITION CONTAINING MODIFIED CONJUGATED DIENE POLYMER AND TIRE

(75) Inventors: Satoshi Mikami, Kodaira (JP); Kentaro Fujino, Kodaira (JP); Yoichi Ozawa, Kodaira (JP); Akira Suzuki, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 71 days.

(21) Appl. No.: 10/550,554

(22) PCT Filed: Mar. 19, 2004

(86) PCT No.: PCT/JP2004/003760

§ 371 (c)(1),
(2), (4) Date: Sep. 26, 2005

(87) PCT Pub. No.: WO2004/087802

PCT Pub. Date: Oct. 14, 2004

(65) Prior Publication Data

US 2006/0217470 A1    Sep. 28, 2006

(30) Foreign Application Priority Data

Mar. 28, 2003  (JP) .............................. 2003-090119

(51) Int. Cl.
*C08F 8/30* (2006.01)

(52) U.S. Cl. ..................................... 524/555; 524/572

(58) Field of Classification Search ................ 524/572, 524/272, 555; 526/180
See application file for complete search history.

(56) References Cited

U.S. PATENT DOCUMENTS

| | | | |
|---|---|---|---|
| 6,103,808 | A | 8/2000 | Hashimoto |
| 6,399,697 | B1 | 6/2002 | Takasaki et al. |
| 6,602,942 | B1 | 8/2003 | Karato |
| 6,624,267 | B1 | 9/2003 | Favrot et al. |
| 2002/0045697 | A1 | 4/2002 | Sohnen et al. |
| 2002/0120082 | A1* | 8/2002 | Hsu et al. ................... 526/180 |
| 2005/0131181 | A1* | 6/2005 | Halasa et al. ............... 526/258 |

FOREIGN PATENT DOCUMENTS

| | | |
|---|---|---|
| EP | 0 451 603 A2 | 10/1991 |
| EP | 0 590 491 A2 | 4/1994 |
| EP | 590 490 A1 | 4/1994 |
| EP | 0 600 208 A1 | 6/1994 |
| EP | 0 709 408 | 5/1996 |
| EP | 0 718 321 A1 | 6/1996 |
| EP | 0 741 148 A1 | 11/1996 |
| EP | 0 593 049 B1 | 1/1997 |
| EP | 0 832 903 A2 | 4/1998 |
| EP | 1 018 521 A1 | 7/2000 |
| EP | 1 188 789 A1 | 3/2002 |
| JP | 07-53616 A | 2/1995 |
| JP | 2000-281835 A | 10/2000 |
| JP | 2002-88192 A | 3/2002 |

* cited by examiner

*Primary Examiner*—Peter D Mulcahy
(74) *Attorney, Agent, or Firm*—Sughrue Mion, PLLC

(57) ABSTRACT

This invention relates to a rubber composition having a high interaction between rubber component and carbon black, a good wear resistance and an excellent low heat buildup (low hysteresis loss), and more particularly to a rubber composition comprising (A) 100 parts by mass of a rubber component containing not less than 10% by mass of a conjugated diene polymer having a polymer chain with at least one functional group selected from the group consisting of particular substituted amino group and cyclic amino group, (B) not less than 20 parts by mass of carbon black and (C) not more than 1.0 part by mass of a polycyclic aromatic compound (PCA).

34 Claims, No Drawings

RUBBER COMPOSITION CONTAINING MODIFIED CONJUGATED DIENE POLYMER AND TIRE

TECHNICAL FIELD

This invention relates to a rubber composition using a modified conjugated diene polymer and a tire. More particularly, the invention relates to a rubber composition using a modified conjugated diene polymer with a high interaction with a carbon black, a good wear resistance and an excellent low heat buildup (low hysteresis loss), and a heavy duty tire using the same.

BACKGROUND ART

Heretofore, carbon black is frequently used as a filler for rubber reinforcement. Because, the carbon black can be given a high reinforcing property and an excellent wear resistance as compared with the other fillers. On the other hand, with the escalation in the recent social demand on energy saving and in the interest on the environmental problem are more increasing the attention of low fuel consumption in automobiles and the demand on the low heat buildup in the rubber composition for tires accompanied therewith. As a countermeasure is considered the decrease of the filling amount of carbon black or the use of large particle size carbon black. In these cases, however, there is known that it is unavoidable to lower the reinforcing property, wear resistance and gripping property on wet road surface. On the contrary, silica hydride (wet silica) is known as a filler for establishing the low heat buildup and the gripping property on wet road surface (see, for example, JP-A-3-252431, JP-A-6-248116, JP-A-7-70369, JP-A-8-245838 and JP-A-8-337687), and many studies and developments are made.

However, silica has a tendency that particles are aggregated to each other due to hydrogen bond of silanol group as a surface functional group, so that it is required to prolong the milling time for improving the dispersion of silica particles into rubber. Also, the dispersion of silica particles into rubber is insufficient, so that there are drawbacks that the Moony viscosity of the rubber composition becomes high and the processability in the extrusion or the like is poor. Furthermore, since the surfaces of silica particles are acidic, they have a drawback that a basic substance used as a vulcanization accelerator is adsorbed to conduct the insufficient vulcanization of the rubber composition and hence the elastic modulus is not increased. In order to solve the above-drawbacks, silane coupling agents are developed. In the latter case, however, the dispersion of silica particles does not arrive at a sufficient level, and particularly it is difficult to industrially obtain the good dispersion of silica particles.

In order to provide rubber compositions having a low heat buildup, there have hitherto been made many technological developments for enhancing the dispersibility of the filler used in the rubber composition. Among them is most popularly made a method wherein a polymeric activating end of a diene polymer obtained an anion polymerization using an organolithium compound, particularly styrene-butadiene copolymer is modified with a functional group having an interaction with the filler. Under the aforementioned situations, it is variously attempted to apply this technique to a system using carbon black as a reinforcing filler.

For example, there are mentioned a method wherein carbon black is used as a reinforcing filler and the polymeric activating end is modified with a tin compound such as tin tetrachloride or the like (see JP-B-5-87530), a method wherein carbon black is used likewise the above and both the polymeric activating ends are modified with the tin compound (see JP-A-6-49279), a method wherein carbon black is used likewise the above and an amino group is introduced into the polymeric activating end (see JP-A-62-207342, JP-A-6-199923, JP-A-8-231658 and JP-A-8-225604) and the like.

However, almost of the improvements described in these patent articles are examined on the styrene-butadiene copolymer. Although the improving effect on the low heat buildup is recognized, when this copolymer is applied to a tread or the like of a heavy duty tire, it can not still be said that the low heat buildup is sufficient.

Further, in order to improve the low heat buildup and wear resistance, a high cis-polybutadiene rubber obtained by using a cobalt-nickel-neodymium catalyst has been used together with natural rubber from the old time. However, the low heat buildup is still insufficient likewise the above, so that the further improvement is required for satisfying the marketing needs.

DISCLOSURE OF THE INVENTION

Under the above situation, it is an object of the invention to provide a rubber composition having a high interaction with carbon black, a good wear resistance and an excellent low heat buildup (low hysteresis loss) using a modified conjugated diene polymer which gives the above properties to the rubber composition as well as a tire, particularly a heavy duty tire.

The inventors have made various studies for achieving the above object and found that the object can be attained by compounding a polyfunctional conjugated diene polymer having a functional group consisting of at least one specified amino group and tin-carbon bond in its molecular end or chain, particularly a polyfunctional low cis-polybutadiene rubber, and a high-grade carbon black as a filler into the rubber composition to suppress a PCA content derived from a softening agent to a low level. The invention has been accomplished based on such a knowledge.

That is, the invention is as follows:

(1) A rubber composition using a modified conjugated diene polymer, characterized by comprising (A) 100 parts by mass of a rubber component containing not less than 10% by mass of a conjugated diene polymer having a polymer chain with at least one functional group selected from the group consisting of a substituted amino group represented by the following formula (I):

(wherein $R_1$ is independently an alkyl, cycloalkyl or aralkyl group having a carbon number of 1-12) and a cyclic amino group represented by the following formula (II):

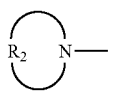

(wherein $R_2$ is an alkylene group having 3-16 methylene groups, a substituted alkylene group or an oxy- or N-alkylamino-alkylene group); (B) not less than 20 parts by mass of carbon black and (C) not more than 1.0 part by mass of a polycyclic aromatic compound (PCA).

(2) A rubber composition according to the item (1), wherein the conjugated diene polymer is a copolymer of butadiene and an aromatic vinyl compound or a homopolymer of butadiene.

(3) A rubber composition according to the item (2), wherein a vinyl bond content in butadiene portion is not more than 25%.

(4) A rubber composition according to the item (2) or (3), wherein a content of the aromatic vinyl compound as a copolymer component is not more than 10% by mass.

(5) A rubber composition according to any one of the items (2)-(4), wherein the aromatic vinyl compound as a copolymer component is styrene.

(6) A rubber composition according to the item (2) or (3), wherein the conjugated diene polymer is polybutadiene.

(7) A rubber composition according to any one of the items (1)-(6), wherein the conjugated diene polymer has a glass transition temperature (Tg) of not higher than −50° C.

(8) A rubber composition according to any one of the items (1)-(7), wherein $R_1$ in the formula (I) is methyl group, ethyl group, butyl group, octyl group, cyclohexyl group, 3-phenyl-1-propyl group or isobutyl group.

(9) A rubber composition according to any one of the items (1)-(7), wherein $R_2$ in the formula (II) is tetramethylene group, hexamethylene group, oxydiethylene group, N-alkylazadiethylene group, dodecamethylene group or hexadecamethylene group.

(10) A rubber composition according to any one of the items (1)-(9), wherein the conjugated diene polymer is formed by forming a solution of one or more anion-polymerizable monomers consisting essentially of 1,3-butadiene in a hydrocarbon solvent, and then polymerizing the monomers with (D) a lithioamine represented by a general formula of $(AM)Li(Q)_y$ (wherein y is 0 or about 0.5 to 3, and Q is a soluble component selected from the group consisting of a hydrocarbon, an ether, an amine and a mixture thereof, and AM is the formula (I):

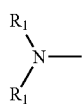

[I]

(wherein $R_1$ is the same as mentioned above) or the formula (II):

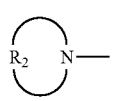

[II]

(wherein $R_2$ is the same as mentioned above)) or a mixture of the item (D) and (E) an organic alkali metal compound as a polymerization initiator.

(11) A rubber composition according to any one of the items (1)-(10), wherein the conjugated diene polymer has at least one tin-carbon bond or silicon-carbon bond derived from a coupling agent of a formula: $(R_3)_a ZX_b$ (wherein Z is tin or silicon, and $R_3$ is selected from the group consisting of an alkyl group having a carbon number of 1-20, a cycloalkyl group having a carbon number of 3-20, an aryl group having a carbon number of 6-20 and an aralkyl group having a carbon number of 7-20, and a is 0 to 3, b is 1 to 4 and a+b=4).

(12) A rubber composition according to any one of the items (1)-(11), wherein not less than 20% by mass of natural rubber and/or polyisoprene rubber is included in 100 parts by mass of the rubber component containing the conjugated diene polymer.

(13) A rubber composition according to any one of the items (1)-(12), wherein carbon black as the component (B) has a nitrogen adsorption specific surface area ($N_2SA$) of not less than 70 m²/g.

(14) A rubber composition according to any one of the items (1)-(13), wherein PCA as the component (C) is derived from a softening agent.

(15) A rubber composition according to any one of the items (1)-(14), wherein an extractable of the rubber composition after vulcanization with acetone-chloroform is not more than 20% by mass per the mass of the rubber composition after vulcanization.

(16) A tire characterized by using a rubber composition as described in any one of the items (1)-(15).

(17) A tire according to the item (16), wherein the rubber composition is applied to a tread.

(18) A tire according to the item (16) or (17), wherein the tire is a heavy duty tire.

BEST MODE FOR CARRYING OUT THE INVENTION

At first, the rubber composition according to the invention comprises (A) 100 parts by mass of a rubber component containing not less than 10% by mass of a conjugated diene polymer having a polymer chain with at least one functional group selected from the group consisting of a substituted amino group represented by the following formula (I):

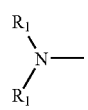

[I]

(wherein $R_1$ is independently an alkyl, cycloalkyl or aralkyl group having a carbon number of 1-12) and a cyclic amino group represented by the following formula (II):

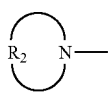

[II]

(wherein $R_2$ is an alkylene group having 3-16 methylene groups, a substituted alkylene group or an oxy- or N-alkylamino-alkylene group); (B) not less than 20 parts by mass of carbon black and (C) not more than 1.0 part by mass of a polycyclic aromatic compound (PCA).

The substituted amino group of the formula (I) as a functional group of the conjugated diene polymer used in the rubber composition of the invention is not particularly limited as long as $R_1$ group in the formula is an alkyl, cycloalkyl or aralkyl group having a carbon number of 1-12, but there are preferably mentioned methyl group, ethyl group, butyl group, octyl group, cyclohexyl group, 3-phenyl-1-propyl group, isobutyl group and the like. In the formula (I), $R_1$s may be the same or different.

Further, the cyclic amino group of the formula (II) as a functional group of the conjugated diene polymer used in the rubber composition of the invention is not particularly limited as long as $R_2$ group in the formula is an alkylene group having 3-16 methylene groups, a substituted alkylene group or an oxy- or N-alkylamino-alkylene group.

At this moment, the substituted alkylene includes mono-substituted to octa-substituted alkylenes. A preferable substituent is a linear or branched alkyl group having a carbon number of 1 to about 12, a cycloalkyl group, a bicycloalkyl group, an aryl group or an aralkyl group. As a preferable $R_2$ group are mentioned trimethylene group, tetramethylene group, hexamethylene group, oxydiethylene group, N-alkylazadiethylene group, dodecamethylene group, hexadecamethylene group and the like.

Also, many useful examples are existent as the cyclic amines including alkyl, cycloalkyl, aryl and aralkyl substituents of cyclic and dicyclic amines, but it is not intended as limitations thereof. There are mentioned 2-(2-ethylhexyl) pyrrolidine; 3-(2-propyl)pyrrolidine; 3,5-bis(2-ethylhexyl) piperidine; 4-phenylpiperidine; 7-decyl-1-azacyclotridecane; 3,3-dimethyl-1-azacyclotetradecane; 4-dodecyl-1-azacyclooctane; 4-(2-phenylbutyl)-1-azacyclooctane; 3-ethyl-5-cyclohexyl-1-azacycloheptane; 4-hexyl-1-azacycloheptane; 9-isoamyl-1-azacycloheptadecane; 2-methyl-1-azacycloheptadece-9-ene; 3-isobutyl-1-azacyclododecane; 2-methyl-7-t-butyl-1-azacyclododecane; 5-nonyl-1-azacyclododecane; 8-(4'-methylphenyl)-5-pentyl-3-azacyclo[5.4.0]undecane; 1-butyl-6-azacyclo[3.2.1]octane; 8-ethyl-3-azacyclo[3.2.1]octane; 1-propyl-3-azacyclo[3.2.2]nonane; 3-(t-butyl)-7-azacyclo[4.3.0]nonane; 1,5,5-trimethyl-3-azacyclo[4.4.0]decane and the like.

Furthermore, it is required that not less than 10% by mass of a conjugated diene polymer having a polymer chain with at least one functional group selected from the group consisting of di-substituted amino group and cyclic amino group (which may be called as a modified conjugated diene polymer hereinafter) is compounded into the rubber component of the rubber composition according to the invention. By compounding not less than 10% by mass of the modified conjugated diene polymer can be obtained an excellent low heat buildup. The amount is preferably 20-80% by mass, more preferably 30-65% by mass. By compounding the modified conjugated diene polymer within the above range can be obtained the excellent low heat buildup while maintaining the wear resistance of the rubber composition.

As an example of the conjugated diene monomer in the modified conjugated diene polymer are mentioned 1,3-butadiene, isoprene, 1,3-pentadiene, 2,3-dimethyl-1,3-butadiene and 1,3-hexadiene, and particularly 1,3-butadiene is preferable. As an example of an aromatic vinyl compound monomer being a copolymer component are mentioned styrene, alpha-methyl styrene, p-methyl styrene, vinyl toluene and vinyl naphthalene, and particularly styrene is preferable.

The modified conjugated diene polymer may be a copolymer of a conjugated diene and an aromatic vinyl compound or a homopolymer of a conjugated diene. Polybutadiene is most preferable as the homopolymer of the conjugated diene. Styrene-butadiene copolymer is preferable as the copolymer of the conjugated diene and the aromatic vinyl compound. Also, the styrene content in the copolymer is preferable to be not more than 10% by mass. The vinyl bond content of butadiene portion in the modified conjugated diene polymer is not more than 25%, preferably not more than 16%. By limiting the styrene content and the vinyl bond content of butadiene portion in the modified conjugated diene polymer to the above ranges can be obtained the rubber composition according to the invention having a good wear resistance and an excellent low heat buildup.

Also, the glass transition temperature of the modified conjugated diene polymer is preferable to be not higher than −50° C.

As a method of introducing at least one functional group selected from the group consisting of di-substituted amino group and cyclic amino group into the conjugated diene polymer, for example, there is a method wherein the cyclic amino group is bonded through at least one nitrogen atom thereof to the organic group containing 2-hydroxy-1,3-propylene group bonded to the conjugated diene polymer (which is described in JP-A-2001-131227 in detail) or the like, but there is preferably used a method wherein the polymeric initiation end is modified with the cyclic amino group or the like using the aforementioned lithioamine (D) or a mixture of the (D) and the organoalkali metal as a polymerization initiator.

That is, the modified conjugated diene polymer can be obtained by forming a solution of one or more anion-polymerizable monomers consisting essentially of 1,3-butadiene in a hydrocarbon solvent, and then polymerizing the monomers with (D) a lithioamine represented by a general formula of (AM)Li(Q)y (wherein y is 0 or about 0.5 to about 3, and Q is a soluble component selected from the group consisting of a hydrocarbon, an ether, an amine and a mixture thereof, and AM is the formula (I):

(wherein $R_1$ is the same as mentioned above) or the formula (II):

(wherein $R_2$ is the same as mentioned above)) or a mixture of the compound (D) and (E) an organic alkali metal compound as a polymerization initiator.

The lithioamine is represented by the general formula of (AM)Li(Q)$_y$ (wherein Q is a soluble component, and (AM) is a substituted amino group or a cyclic amino group, and y is 0 or 0.5-3).

The soluble component (Q) may be a hydrocarbon, an ether, an amine of a mixture thereof. The presence of the component (Q) is made possible to dissolve the initiator into the hydrocarbon solvent.

Also, the group (Q) includes dienyl or aromatic vinyl polymers or copolymers having a polymerization degree consisting of 3 to about 300 polymerization units. As such a polymer are included polybutadiene, polystyrene, polyisoprene and copolymers thereof. As another example of the group (Q) is included a polar ligand such as tetrahydrofuran (THF) or tetramethylethylene diamine (TMEDA).

The component (AM) shows an amino functional group, which is incorporated, for example, into an initiation site or head portion of the polymer to synthesize a polymer having at least one functional group at its end.

When the soluble component (Q) is ether of an amino compound, a solution of a functioning agent AM-H is produced in an anhydrous aprotic solvent such as cyclohexane or the like in the presence of the component (Q) and then the organolithium compound in the same or similar solvent is added to the solution, whereby an initiator can be produced.

The organolithium compound is represented by a general formula of RLi (wherein R is selected from the group consisting of an alkyl, cycloalkyl, alkenyl, aryl and aralkyl groups having a carbon number of 1 to about 20 and short-chain, low molecular weight polymers obtained from diolefin and vinyl aryl monomers and having not more than 25 units).

As a typical alkyl group are mentioned, for example, n-butyl group, s-butyl group, methyl group, ethyl group, isopropyl group and the like. Also, the cycloalkyl group includes cyclohexyl group, menthyl group and the like, while the alkenyl group preferably includes allyl group, vinyl group and the like.

Further, the aryl and aralkyl groups include phenyl group, benzyl group, oligo(styryl) group and the like. As the short-chain polymer are mentioned oligo(butadienyl), oligo(isoprenyl), oligo(styryl) and the like produced by initiating the formation of an oligomer from a suitable monomer with an organolithium. Also, in-situ method (described in JP-A-6-199921) is preferably used. As the organolithium compound is preferable n-butyllithium.

The organic alkali metal compound (E) used in the initiator system, if necessary, is preferably selected from compounds represented by general formulae of $R_4M$, $R_5OM$, $R_6C(O)OM$, $R_7R_8NM$ and $R_9SO_3M$, wherein each of $R_4$, $R_5$, $R_6$, $R_7$, $R_8$ and $R_9$ is selected from the group consisting of alkyl, cycloalkyl, alkenyl and aryl groups having a carbon number of about 1 to about 12 and phenyl group. The metal component M is selected from the group consisting of Na, K, Rb and Cs. The preferable M is Na or K.

Further, the initiator mixture can preferably contain the organic alkali metal compound at a mixing ratio of about 0.5 to about 0.02 equivalent per 1 equivalent of lithium in the lithioamine initiator. The compound (E) is preferably used in case of obtaining a target polymer having a high styrene content.

Moreover, a chelating agent can be used as an assistant in the initiator mixture for uniformly conducting the polymerization. As a useful chelating agent are mentioned, for example, tetramethylene ethylene diamine (TMEDA), oxolanyl cyclic acetals, cyclic oligomer-like oxolanyl alkanes and the like. The cyclic oligomer-like oxolanyl alkanes are particularly preferable, which concretely include 2,2-bis(tetrahydrofuryl)propane.

As the conjugated diene monomer in the modified conjugated diene polymer used in the rubber composition according to the invention are mentioned 1,3-butadiene, isoprene, 1,3-pentadiene, 2,3-dimethyl-1,3-butadiene, 1,3-hexadiene and the like, and as the aromatic vinyl monomer are mentioned styrene, alpha-methyl styrene, p-methyl styrene, vinyl toluene, vinyl naphthalene and the like. As the modified conjugated diene polymer is most preferable polybutadiene. When the modified conjugated diene polymer is styrene-butadiene copolymer, a preferable mass ratio of styrene/1,3-butadiene monomer is within a range of 10/90-0/100.

As a polymerization solvent are used, for example, various hexanes, heptanes, octanes and mixtures thereof.

In order to provide an excellent low heat buildup, the conjugated diene polymer is preferable to have at least one functional group consisting of amino group and at least one tin-carbon bond or silicon-carbon bond derived from a coupling agent of $(R_3)_aZX_b$. At this moment, Z is tin or silicon, and Z is preferable to be tin.

$R_3$ is an alkyl group having a carbon number of 1 to 20, a cycloalkyl group having a carbon number of 3 to 20, an aryl group having a carbon number of 6 to 20 or an aralkyl group having carbon number of 7 to 20. For example, $R_3$ includes methyl group, ethyl group, n-butyl group, neophyl group, cyclohexyl group, n-octyl group, 2-ethylhexyl group and the like.

X is chlorine or bromine, and a is 0 to 3 and b is 1 to 4, provided that a+b=4.

As a preferable coupling agent are mentioned tin tetrachloride, $(R_3)SnCl_3$, $(R_3)_2SnCl_2$, $(R_3)_3SnCl$ and the like, and tin tetrachloride is particularly preferable.

Also, the other modifying agent can be used. As the modifying agent are preferably mentioned carbodimides, N-methyl pyrrolidinone, cyclic amides, cyclic ureas, isocyanates, Schiff base, 4,4'-bis(diethylamino)benzophenone and the like.

One preferable modified conjugated diene polymer used in the rubber composition according to the invention is a polymer containing at least one functional group Am, in which Am is derived from a reaction product of an amine and an organolithiun compound. Further preferable modified conjugated polymer is a polymer indicating a polyfunctionality because the polymer has a tin-carbon bond, in which the tin-carbon bond can be derived from a modifying agent made from, for example, a terminator, a coupling agent or a linking agent.

After the above modifying agent is added to a reaction vessel, the stirring is carried out in the vessel for about 1 to about 1000 minutes, whereby the tin-carbon bond can be given to the polymer. As a result, there is obtained a modified conjugated diene polymer indicating a larger affinity to carbon black as a reinforcing filler and improving the dispersibility of carbon black and having an excellent low heat buildup.

Also, carbon black as the component (B) is required to be compounded in an amount of not less than 20 parts by mass per 100 parts by mass of the rubber component in the rubber composition according to the invention, and further it is preferable to be compounded in an amount of 30-70 parts by mass. When the amount of carbon black is within the above range, the rubber composition can take a balance between the excellent low heat buildup and the wear resistance.

The carbon black as the component (B) is preferable to have a nitrogen adsorption specific surface area ($N_2SA$) of not less than 70 $m^2/g$. By limiting the nitrogen adsorption specific surface area of the carbon black to the above range can be ensured the wear resistance of the rubber composition.

As the carbon black, HAF ($N_2SA$: 83 $m^2/g$), ISAF ($N_2SA$: 111 $m^2/g$) and SAF ($N_2SA$: 126 $m^2/g$) are preferable, and particularly ISAF and SAF are preferable.

Further, the amount of the polycyclic aromatic compound as the component (C) is required to be not more than 1.0 part by mass per 100 parts by mass of the rubber component in the rubber composition according to the invention. It is preferably not more than 0.5 part by mass, most preferably 0 part by mass.

The amount of the softening agent compounded is preferably not more than 15 parts by mass, more preferably 0-10 parts by mass per 100 parts by mass of the rubber component.

In the rubber composition according to the invention, it is necessary to highly balance the low heat buildup and the wear resistance. In order to ensure the wear resistance, it is preferable to use carbon black having a strong reinforcing action, for example, ISAF and SAF class. However, it is difficult to uniformly disperse the carbon black as the particle size becomes small.

As one improving way, the rubber composition according to the invention enhances the affinity with carbon black and improves the dispersibility of carbon black by using a polyfunctional modified polybutadiene including a functional group made of amino group in an end of the polymer and tin-carbon bond different from the amino group in a molecular chain or end of the polymer, whereby the establishment of low heat buildup and wear resistance can be attained, but the compounding of the softening agent is frequently carried out for further improving the dispersion and operability.

However, the polycyclic aromatic compound (PCA) included in the softening agent acts as a radical trapping agent in the milling of the rubber composition and masks the active site of the functional group, which has a possibility that the precious effect of improving the dispersion is damaged. Therefore, it is preferable that the polycyclic aromatic compound (PCA) in the softening agent is made small as far as possible.

As a method of removing the PCA component from the softening agent, therefore, there is carried out a secondary treatment such as a method of selectively extracting with a solvent, a method through hydrogenation treatment or the like. In case of using the softening agent, a rubber composition having an excellent low heat buildup and a high wear resistance can be obtained by using a softening agent having a low PCA component as mentioned above without damaging the dispersion of the carbon black.

In the rubber composition according to the invention, it is preferable that natural rubber and/or polyisoprene rubber are included in an amount of not less than 20% by mass as another rubber in the rubber component containing the modified conjugated diene polymer. It is more preferably not less than 40% by mass.

When not less than 20% by mass of natural rubber and/or polyisoprene rubber is included in the rubber composition, the operability, fracture properties and low heat buildup are improved and the lowering of the wear resistance is suppressed.

Moreover, natural rubber is preferable from a viewpoint of the balance among the performances. In the blend system of the modified polybutadiene rubber and the natural rubber, most of the carbon black is distributed into the modified polybutadiene, so that the effect of improving the dispersion of the carbon black is developed more remarkably.

Furthermore, the other rubbers such as styrene-butadiene rubber, polybutadiene rubber, acrylonitrile-butadiene rubber, chloroprene rubber, butyl rubber and the like may be added to the rubber composition within a range not damaging the effects of the rubber composition according to the invention. They may be used alone or in a combination of two or more.

Also, the rubber composition used in the tire according to the invention may be properly compounded with the other additives for rubber such as sulfur, a vulcanization accelerator, an antioxidant and the like, if necessary.

Moreover, an extractable of the rubber composition after vulcanization with acetone-chloroform is preferable to be not more than 20% by mass per the mass of the rubber composition after vulcanization. When the extractable with acetone-chloroform after the vulcanization satisfies the above range, there can be obtained a rubber composition having excellent wear resistance and low heat buildup.

The rubber composition according to the invention is obtained by milling through a milling machine such as rolls, internal mixer or the like, and can be used as a member for the tire according to the invention, or a tire constituting member such as tire tread portion (cap tread and/or under tread), carcass, sidewall, bead portion or the like. Particularly, it is preferably used as a rubber composition for a tread portion (cap tread and/or under tread) of a heavy duty tire according to the invention highly balancing the wear resistance and the low heat buildup.

The tire according to the invention is produced by the usual method using the rubber composition. That is, the rubber composition containing the above various additives, if necessary, is extruded into each of the tire constituting members at an uncured stage and attached onto a tire building machine and shaped by the usual method to form a green tire. Then, the green tire is heated in a vulcanization machine under pressure to produce a tire.

The thus obtained tire according to the invention is excellent in the heat buildup and can considerably improve the wear resistance.

Also, the tire according to the invention can be used by filling a gas such as air nitrogen or the like into its interior.

The following examples are given in illustration of the invention and are not intended as limitations thereof.

EXAMPLES

Various measurements are carried out by the following methods.

(Properties of Conjugated Diene Polymer)

(1) Micro-Structure of Polymer

The vinyl bond content (1,2-bond) and styrene content in the conjugated diene unit are measured from integral ratios of 1H-NMR spectra (Alpha 400 MHz NMR device, made by JEOL Ltd. in $CDCl_3$). The evaluation results are shown in Table 1.

(2) Coupling Efficiency of Polymer (%)

As the coupling efficiency is used an area ratio of peaks at a high molecular weight side among data obtained through a gel permeation chromatography (GPC). The evaluation results are shown in Table 1.

(Performances of Vulcanized Rubber)

(1) Tan δ

Tan δ at 50° C. is measured by using Ares made by RHEOMETRICS. It is indicated by an index on the basis that a control rubber composition is 100, in which the smaller the index value, the lower tan δ (low heat buildup). At this moment, Comparative Example 1 in Table 2, Comparative Example 4 in Table 3, Comparative Example 8 in Table 4 and Comparative Example 9 in Table 5 are used as the control rubber composition. The evaluation results are shown in Tables 2-5.

(2) Wear Resistance

It is calculated according to the following equation by using a wear loss quantity through a Lambourn abrasion tester.

Wear resistance=[(weight loss of a specimen of the control rubber composition)/(weight loss of a specimen to be tested)]×100

That is, it shows the hard wearing of the specimen to be tested when the control rubber composition is 100, in which the larger the numerical value, the better the wear resistance. In this case, Comparative Example 1 in Table 2, Comparative Example 4 in Table 3, Comparative Example 8 in Table 4 and Comparative Example 9 in Table 5 are used as the control rubber composition likewise tan δ. The evaluation results are shown in Tables 2-5.

(3) Extraction Process with acetone-chloroform

It is according to JIS K6350. The evaluation results are shown in Tables 2-5.

Production Example 1

(Production method of polymer A) no Modification
H—H

Into a pressure glass vessel of about 900 ml in capacity dried and purged with nitrogen are charged 283 g of cyclohexane, 50 g of 1,3-butadiene monomer and a cyclohexane solution of 0.0057 mmol of 2,2-ditetrahydrofuryl propane, and 0.57 mmol of n-butyllithium (BuLi) is added, which is placed in a warm bath of 50° C. provided with a stirrer to conduct polymerization for 4.5 hours. The degree of conversion is approximately 100%. To this polymerization system is added 0.5 ml of a 5% solution of 2,6-di-t-butyl paracresol (BHT) in isopropanol to stop the reaction, and further the drying is carried out by the usual manner to obtain a polymer A. The vinyl bond content in butadiene portion is 14%, and the coupling efficiency is 0%.

Polymerization Example 2

(Production Method of Polymer B) Modification
N—H

Into a pressure glass vessel of about 900 ml in capacity dried and purged with nitrogen are charged 283 g of cyclohexane, 50 g of 1,3-butadiene monomer and a cyclohexane solution of each of 0.0057 mmol of 2,2-ditetrahydrofuryl propane and 0.513 mmol of hexamethylene imine, and 0.57 mmol of n-butyllithium (BuLi) is added, which is placed in a warm bath of 50° C. provided with a stirrer to conduct polymerization for 4.5 hours. The degree of conversion is approximately 100%. To this polymerization system is added 0.5 ml of a 5% solution of 2,6-di-t-butyl paracresol (BHT) in isopropanol to stop the reaction, and further the drying is carried out by the usual manner to obtain a polymer B. The vinyl bond content in butadiene portion is 14%, and the coupling efficiency is 1%.

Polymerization Example 3

(Production Method of Polymer C) Modification
H—Sn

Into a pressure glass vessel of about 900 ml in capacity dried and purged with nitrogen are charged 283 g of cyclohexane, 50 g of 1,3-butadiene monomer and a cyclohexane solution of 0.0057 mmol of 2,2-ditetrahydrofuryl propane, and 0.57 mmol of n-butyllithium (BuLi) is added, which is placed in a warm bath of 50° C. provided with a stirrer to conduct polymerization for 4.5 hours. The degree of conversion is approximately 100%. To this polymerization system is added a solution of 0.100 mmol of tin tetrachloride in cyclohexane, which is stirred at 50° C. for 30 minutes. Thereafter, 0.5 ml of a 5% solution of 2,6-di-t-butyl paracresol (BHT) in isopropanol is added to stop the reaction, and further the drying is carried out by the usual manner to obtain a polymer C. The vinyl bond content in butadiene portion is 14%, and the coupling efficiency is 69%.

Polymerization Example 4

(Production Method of Polymer D) Modification
N—Sn

Into a pressure glass vessel of about 900 ml in capacity dried and purged with nitrogen are charged 283 g of cyclohexane, 50 g of 1,3-butadiene monomer, and a cyclohexane solution of each of 0.0057 mmol of 2,2-ditetrahydrofuryl propane and 0.513 mmol of hexamethylene-imine, and 0.57 mmol of n-butyllithium (BuLi) is added, which is placed in a warm bath of 50° C. provided with a stirrer to conduct polymerization for 4.5 hours. The degree of conversion is approximately 100%. To this polymerization system is added a solution of 0.100 mmol of tin tetrachloride in cyclohexane, which is stirred at 50° C. for 30 minutes. Thereafter, 0.5 ml of a 5% solution of 2,6-di-t-butyl paracresol (BHT) in isopropanol is added to stop the reaction, and further the drying is carried out by the usual manner to obtain a polymer D. The vinyl bond content in butadiene portion is 14%, and the coupling efficiency is 65%.

TABLE 1

| | Polymer | | | | |
|---|---|---|---|---|---|
| | A | B | C | D | E |
| Vinyl bond content (%) | 14 | 14 | 14 | 14 | 2 |
| Glass transition temperature (Tg) | −95 | −95 | −95 | −95 | −104 |
| Coupling efficiency (%) | 0 | 1 | 69 | 65 | 0 |

A rubber composition is prepared by compounding carbon black, softening agent, stearic acid, antioxidant 6C, zinc oxide, vulcanization accelerator CZ and sulfur based on 100 parts by mass of the rubber component according to the kinds and amounts shown in Tables 2-5.

Each of these uncured rubber compositions is vulcanized at 150° C. for 30 minutes to obtain a vulcanized rubber composition, and the heat buildup performance, wear resistance and extraction amount with acetone-chloroform are evaluated by the aforementioned methods.

TABLE 2

| | Comparative Example 1 | Example 1 | Comparative Example 2 | Example 2 | Comparative Example 3 |
|---|---|---|---|---|---|
| Natural rubber (Polybutadiene rubber) | 50 | 50 | 50 | 50 | 50 |
| Polymer A | 50 | | | | |
| Polymer B | | 50 | | | |
| Polymer C | | | 50 | | |
| Polymer D | | | | 50 | |
| Polymer E | | | | | 50 |
| Carbon black | 50 | 50 | 50 | 50 | 50 |
| Softening agent A | 0 | 0 | 0 | 0 | 0 |
| Softening agent B | 0 | 0 | 0 | 0 | 0 |
| Stearic acid | 2 | 2 | 2 | 2 | 2 |

TABLE 2-continued

|  | Comparative Example 1 | Example 1 | Comparative Example 2 | Example 2 | Comparative Example 3 |
|---|---|---|---|---|---|
| Antioxidant 6c | 1.5 | 1.5 | 1.5 | 1.5 | 1.5 |
| Zinc oxide | 3.5 | 3.5 | 3.5 | 3.5 | 3.5 |
| Vulcanization accelerator CZ | 1.4 | 1.4 | 1.4 | 1.4 | 1.4 |
| Sulfur | 1 | 1 | 1 | 1 | 1 |
| PCA content | 0 | 0 | 0 | 0 | 0 |
| Tan δ | 100 | 83 | 95 | 70 | 107 |
| Improving width against no-modification | 0 | 17 | 5 | 30 | −7 |
| Wear resistance | 100 | 109 | 104 | 112 | 129 |
| Extractable with acetone-chloroform (%) | 4 | 4 | 4 | 4 | 4 |

*1 Polymer E: high-cis polybutadiene, made by Ube Industries, Ltd., trade name [150L]
*2 Carbon black: ISAF (N2SA: 111 m$^2$/g)
*3 Softening agent A: PCA content 21.4% by mass
*4 Softening agent B: PCA content 2.5% by mass
*5 Antioxidant 6C: N-(1,3-dimethyl-butyl)-N'-phenyl-p-phenylenediamine
*6 Vulcanization accelerator CZ: N-cyclohexyl-2-benzothiazyl sulfenamide
Note)
Numerical value described in each column of carbon black, softening agent, stearic acid, antioxidant, zinc oxide, vulcanization accelerator and sulfur in Table 2 is a value of part by mass per 100 parts by mass of the rubber component.

Comparative Examples 1-3 and Examples 1-2

As shown in Table 2, by compounding a low-cis polybutadiene rubber having at least one functional group of specified amino group (Example 1) or a polyfunctional low-cis polybutadiene rubber having a functional group of specified amino group and tin-carbon bond in its molecule end or chain and a high-grade carbon black as a filler in the rubber composition is improved the wear resistance as compared with the unmodified low-cis polybutadiene rubber, and particularly the low heat buildup is largely improved, and the improving effect of Example 2 is particularly excellent.

TABLE 3

|  | Comparative Example 4 | Comparative Example 5 | Comparative Example 6 | Comparative Example 7 |
|---|---|---|---|---|
| Natural rubber (Polybutadiene rubber) | 50 | 50 | 50 | 50 |
| Polymer A | 50 |  |  |  |
| Polymer B |  | 50 |  |  |
| Polymer C |  |  | 50 |  |
| Polymer D |  |  |  | 50 |
| Carbon black | 50 | 50 | 50 | 50 |
| Softening agent A | 10 | 10 | 10 | 10 |
| Softening agent B | 0 | 0 | 0 | 0 |
| Stearic acid | 2 | 2 | 2 | 2 |
| Antioxidant 6c | 1.5 | 1.5 | 1.5 | 1.5 |
| Zinc oxide | 3.5 | 3.5 | 3.5 | 3.5 |
| Vulcanization accelerator CZ | 1.4 | 1.4 | 1.4 | 1.4 |
| Sulfur | 1 | 1 | 1 | 1 |
| PCA content (part by mass) | 2.1 | 2.1 | 2.1 | 2.1 |
| Tan δ | 100 | 94 | 97 | 78 |
| Improving width against no-modification | 0 | 6 | 3 | 22 |
| Wear resistance | 100 | 103 | 103 | 109 |
| Extractable with acetone-chloroform (%) | 9 | 9 | 9 | 9 |

Comparative Examples 4-7

The above comparative examples are obtained by further compounding 2.1 parts by mass of PCA (10 parts by weight of the softening agent A) to the rubber compositions shown in Table 2, from which it is understood that the effect of lowering tan δ is faded by the addition of the softening agent as shown in Table 3.

TABLE 4

|  | Comparative Example 1 | Example 1 | Comparative Example 8 | Example 3 |
|---|---|---|---|---|
| Natural rubber (Polybutadiene rubber) | 50 | 50 | 50 | 50 |
| Polymer A | 50 |  | 50 |  |
| Polymer B |  | 50 |  | 50 |
| Carbon black | 50 | 50 | 50 | 50 |
| Softening agent A | 0 | 0 | 3.5 | 3.5 |
| Softening agent B | 0 | 0 | 0 | 0 |
| Stearic acid | 2 | 2 | 2 | 2 |
| Antioxidant 6c | 1.5 | 1.5 | 1.5 | 1.5 |
| Zinc oxide | 3.5 | 3.5 | 3.5 | 3.5 |
| Vulcanization accelerator CZ | 1.4 | 1.4 | 1.4 | 1.4 |
| Sulfur | 1 | 1 | 1 | 1 |
| PCA content (parts by mass) | 0 | 0 | 0.75 | 0.75 |
| Tan δ | 100 | 83 | 100 | 84 |
| Improving width against no-modification | 0 | 17 | 0 | 16 |
| Wear resistance | 100 | 109 | 100 | 107 |
| Extractable with acetone-chloroform (%) | 4 | 4 | 6 | 6 |

TABLE 5

|  | Comparative Example 1 | Example 1 | Comparative Example 8 | Example 4 |
|---|---|---|---|---|
| Natural rubber (Polybutadiene rubber) | 50 | 50 | 50 | 50 |
| Polymer A | 50 |  | 50 |  |
| Polymer B |  | 50 |  | 50 |
| Carbon black | 50 | 50 | 50 | 50 |
| Softening agent A | 0 | 0 | 0 | 0 |
| Softening agent B | 0 | 0 | 10 | 10 |
| Stearic acid | 2 | 2 | 2 | 2 |
| Antioxidant 6c | 1.5 | 1.5 | 1.5 | 1.5 |

TABLE 5-continued

| | Comparative Example 1 | Example 1 | Comparative Example 8 | Example 4 |
|---|---|---|---|---|
| Zinc oxide | 3.5 | 3.5 | 3.5 | 3.5 |
| Vulcanization accelerator CZ | 1.4 | 1.4 | 1.4 | 1.4 |
| Sulfur | 1 | 1 | 1 | 1 |
| PCA content (parts by mass) | 0 | 0 | 0.25 | 0.25 |
| Tan δ | 100 | 83 | 100 | 83 |
| Improving width against no-modification | 0 | 17 | 0 | 17 |
| Wear resistance | 100 | 109 | 100 | 104 |
| Extractable with acetone-chloroform (%) | 4 | 4 | 9 | 9 |

Comparative Examples 8-9 and Examples 3-4

As shown in Tables 4 and 5, the effect of lowering tan δ is substantially equal when the PCA content is less than 1.0 part by mass.

INDUSTRIAL APPLICABILITY

In the rubber composition according to the invention, the affinity with carbon black is enhanced by using a polyfunctional modified polybutadiene having a functional group of amino group in an end of the polymer or further a tin-carbon bond other than the amino group in a molecule chain or an end of the polymer, and further the dispersion of carbon black is improved by suppressing the PCA content derived from the softening agent to a low level, whereby the excellent low heat buildup and wear resistance can be established simultaneously.

Particularly, the heavy duty tires having an excellent heat buildup and an improved wear resistance can be provided by applying the above rubber composition to a tread portion.

The invention claimed is:

1. A rubber composition using a modified conjugated diene polymer, characterized by comprising (A) 100 parts by mass of a rubber component containing not less than 10% by mass of a conjugated diene polymer having a polymer chain with at least one functional group selected from the group consisting of a substituted amino group represented by the following formula (I):

[I]

wherein $R_1$ is independently an alkyl, cycloalkyl or aralkyl group having a carbon number of 1-12,
and a cyclic amino group represented by the following formula (II):

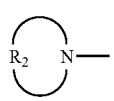

[II]

wherein $R_2$ is an alkylene group having 3-16 methylene groups, a substituted alkylene group or an oxy- or N-alkylamino-alkylene group, wherein the conjugated diene polymer is formed by forming a solution of one or more anion-polymerizable monomers consisting essentially of 1,3-butadiene in a hydrocarbon solvent, and then polymerizing the monomers with (D) a lithioamine represented by a general formula of $(AM)Li(Q)_y$, wherein y is 0 or 0.5 to 3, and Q is a soluble component selected from the group consisting of a hydrocarbon, an ether, an amine and a mixture thereof, and AM is the formula (I):

[I]

wherein $R_1$ is the same as mentioned above, or the formula (II):

[II]

wherein $R_2$ is the same as mentioned above;

or a mixture of the item (D) and (E) an organic alkali metal compound selected from compounds represented by general formulae of $R_4M$, $R_5OM$, $R_6C(O)OM$, $R_7R_8NM$ and $R_9SO_3M$, wherein each of $R_4$, $R_5$, $R_6$, $R_7$, $R_8$ and $R_9$ is selected from the group consisting of alkyl, cycloalkyl, alkenyl and aryl groups having a carbon number of about 1 to about 12 and phenyl group and M is selected from the group consisting of Na, K, Rb and Cs, as a polymerization initiator in the presence of at least one selected from the group consisting of a hydrocarbon, an ether, an amine and a chelating agent;

(B) not less than 20 parts by mass of carbon black; and (C) not more than 1.0 part by mass of a polycyclic aromatic compound (PCA), wherein the conjugated diene polymer is a copolymer of butadiene and an aromatic vinyl compound or a homopolymer of butadiene, and a content of the aromatic vinyl compound as a copolymer component is not more than 10% by mass.

2. A rubber composition according to claim 1, wherein a vinyl bond content in butadiene portion is not more than 25%.

3. A rubber composition according to claim 1, wherein the aromatic vinyl compound as a copolymer component is styrene.

4. A rubber composition according to claim 1, wherein the conjugated diene polymer is polybutadiene.

5. A rubber composition according to claim 1, wherein the conjugated diene polymer has a glass transition temperature (Tg) of not higher than −50° C.

6. A rubber composition according to claim 1, wherein $R_1$ in the formula (I) is methyl group, ethyl group, butyl group, octyl group, cyclohexyl group, 3-phenyl-1-propyl group or isobutyl group.

7. A rubber composition according to claim 1, wherein $R_2$ in the formula (II) is tetramethylene group, hexamethylene group, oxydiethylene group, N-alkylazadiethylene group, dodecamethylene group or hexadecamethylene group.

8. A rubber composition according to claim 1, wherein the conjugated diene polymer has at least one tin-carbon bond or silicon-carbon bond derived from a coupling agent of a formula: $(R_3)_a ZX_b$, wherein Z is tin or silicon, X is chlorine or bromine, and $R_3$ is selected from the group consisting of an alkyl group having a carbon number of 1-20, a cycloalkyl group having a carbon number of 3-20, an aryl group having a carbon number of 6-20 and an aralkyl group having a carbon number of 7-20, and a is 0 to 3, b is 1 to 4 and a+b =4.

9. A rubber composition according to claim 1, wherein not less than 20% by mass of natural rubber and/or polyisoprene rubber is included in 100 parts by mass of the rubber component containing the conjugated diene polymer.

10. A rubber composition according to claim 1, wherein carbon black as the component (B) has a nitrogen adsorption specific surface area ($N_2SA$) of not less than 70 m$^2$/g.

11. A rubber composition according to claim 1, wherein PCA as the component (C) is derived from a softening agent.

12. A rubber composition according to claim 1, wherein an extractable of the rubber composition after vulcanization with acetone-chloroform is not more than 20% by mass per the mass of the rubber composition after vulcanization.

13. A tire characterized by using a rubber composition as claimed in claim 1.

14. A tire according to claim 13, wherein the rubber composition is applied to a tread.

15. A tire according to claim 13, wherein the tire is a heavy duty tire.

16. A rubber composition according to claim 1, wherein a chelating agent is added to the mixture of the items (D) and (E) during the production of the modified conjugated diene polymer.

17. A rubber composition according to claim 16, wherein the chelating agent is selected from the group consisting of tetramethylene ethylene diamine (TMEDA), oxolanyl cyclic acetals and cyclic oligomer-like oxolanyl alkanes.

18. A rubber composition using a modified conjugated diene polymer, characterized by comprising:
(A) 100 parts by mass of a rubber component containing not less than 10% by mass of a conjugated diene polymer having a polymer chain with at least one functional group selected from the group consisting of a substituted amino group represented by the following formula (I):

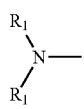

[I]

wherein $R_1$ is independently an alkyl, cycloalkyl or aralkyl group having a carbon number of 1-12,
and a cyclic amino group represented by the following formula (II):

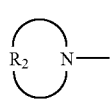

[II]

wherein $R_2$ is an alkylene group having 3-16 methylene groups, a substituted alkylene group or an oxy- or N-alkylamino-alkylene group, wherein the conjugated diene polymer has a vinyl bond content of not less than 14%;
(B) not less than 20 parts by mass of carbon black; and
(C) not more than 1.0 part by mass of a polycyclic aromatic compound (PCA),
wherein the conjugated diene polymer is a copolymer of butadiene and an aromatic vinyl compound or a homopolymer of butadiene, and a content of the aromatic vinyl compound as a copolymer component is not more than 10% by mass.

19. A rubber composition according to claim 18, wherein a vinyl bond content in butadiene portion is not more than 25%.

20. A rubber composition according to claim 18, wherein the aromatic vinyl compound as a copolymer component is styrene.

21. A rubber composition according to claim 18, wherein the conjugated diene polymer is polybutadiene.

22. A rubber composition according to claim 18, wherein the conjugated diene polymer has a glass transition temperature (Tg) of not higher than −50° C.

23. A rubber composition according to claim 18, wherein $R_1$ in the formula (I) is methyl group, ethyl group, butyl group, octyl group, cyclohexyl group, 3-phenyl-1-propyl group or isobutyl group.

24. A rubber composition according to claim 18, wherein $R_2$ in the formula (II) is tetramethylene group, hexamethylene group, oxydiethylene group, N-alkylazadiethylene group, dodecamethylene group or hexadecamethylene group.

25. A rubber composition according to claim 18, wherein the conjugated diene polymer has at least one tin-carbon bond or silicon-carbon bond derived from a coupling agent of a formula: $(R_3)_a ZX_b$, wherein Z is tin or silicon, X is chlorine or bromine, and $R_3$ is selected from the group consisting of an alkyl group having a carbon number of 1-20, a cycloalkyl group having a carbon number of 3-20, an aryl group having a carbon number of 6-20 and an aralkyl group having a carbon number of 7-20, and a is 0 to 3, b is 1 to 4 and a+b =4.

26. A rubber composition according to claim 18, wherein not less than 20% by mass of natural rubber and/or polyisoprene rubber is included in 100 parts by mass of the rubber component containing the conjugated diene polymer.

27. A rubber composition according to claim 18, wherein carbon black as the component (B) has a nitrogen adsorption specific surface area ($N_2$ SA) of not less than 70 m$^2$/g.

28. A rubber composition according to claim 18, wherein PCA as the component (C) is derived from a softening agent.

29. A rubber composition according to claim 18, wherein an extractable of the rubber composition after vulcanization with acetone-chloroform is not more than 20% by mass per the mass of the rubber composition after vulcanization.

30. A tire characterized by using a rubber composition as claimed in claim 18.

31. A tire according to claim 30, wherein the rubber composition is applied to a tread.

32. A tire according to claim 30, wherein the tire is a heavy duty tire.

33. A rubber composition according to claim 9, wherein not less than 40% by mass of natural rubber and/or polyisoprene rubber is included in 100 parts by mass of the rubber component containing the conjugated diene polymer.

34. A rubber composition according to claim 26, wherein not less than 40% by mass of natural rubber and/or polyisoprene rubber is included in 100 parts by mass of the rubber component containing the conjugated diene polymer.

* * * * *